(12) United States Patent
Hisano

(10) Patent No.: US 12,510,987 B2
(45) Date of Patent: Dec. 30, 2025

(54) SENSOR CONTROLLER

(71) Applicant: Wacom Co., Ltd., Saitama (JP)

(72) Inventor: Haruhiko Hisano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/925,971

(22) Filed: Oct. 24, 2024

(65) Prior Publication Data

US 2025/0138665 A1 May 1, 2025

(30) Foreign Application Priority Data

Oct. 31, 2023 (JP) .................................. 2023-186336

(51) Int. Cl.
  *G06F 3/041* (2006.01)
  *G06F 3/0354* (2013.01)
  *G06F 3/038* (2013.01)

(52) U.S. Cl.
  CPC ...... *G06F 3/04162* (2019.05); *G06F 3/03545* (2013.01); *G06F 3/0383* (2013.01); *G06F 2203/0384* (2013.01)

(58) Field of Classification Search
  CPC ............. G06F 3/04162; G06F 3/03545; G06F 3/0383; G06F 2203/0384; G06F 3/0442; G06F 3/04166
  See application file for complete search history.

(56) References Cited

U.S. PATENT DOCUMENTS

| 2022/0013003 A1* | 1/2022 | Yamamoto | G06F 3/0442 |
| 2022/0221972 A1* | 7/2022 | Hisano | G06F 3/03545 |
| 2022/0300135 A1* | 9/2022 | Miyamoto | H04W 72/21 |

FOREIGN PATENT DOCUMENTS

| WO | WO 2020008638 A1 | 1/2020 |

\* cited by examiner

*Primary Examiner* — Temesghen Ghebretinsae
*Assistant Examiner* — Ivelisse Martinez Quiles
(74) *Attorney, Agent, or Firm* — Seed Intellectual Property Law Group LLP

(57) ABSTRACT

Provided is a sensor controller that receives a downlink signal transmitted by a stylus, by performing an operation of receiving each of a plurality of symbols constituting the downlink signal within a window time having a time length shorter than a time length of a transmission duration of one of the symbols by the stylus.

7 Claims, 5 Drawing Sheets

F I G . 6
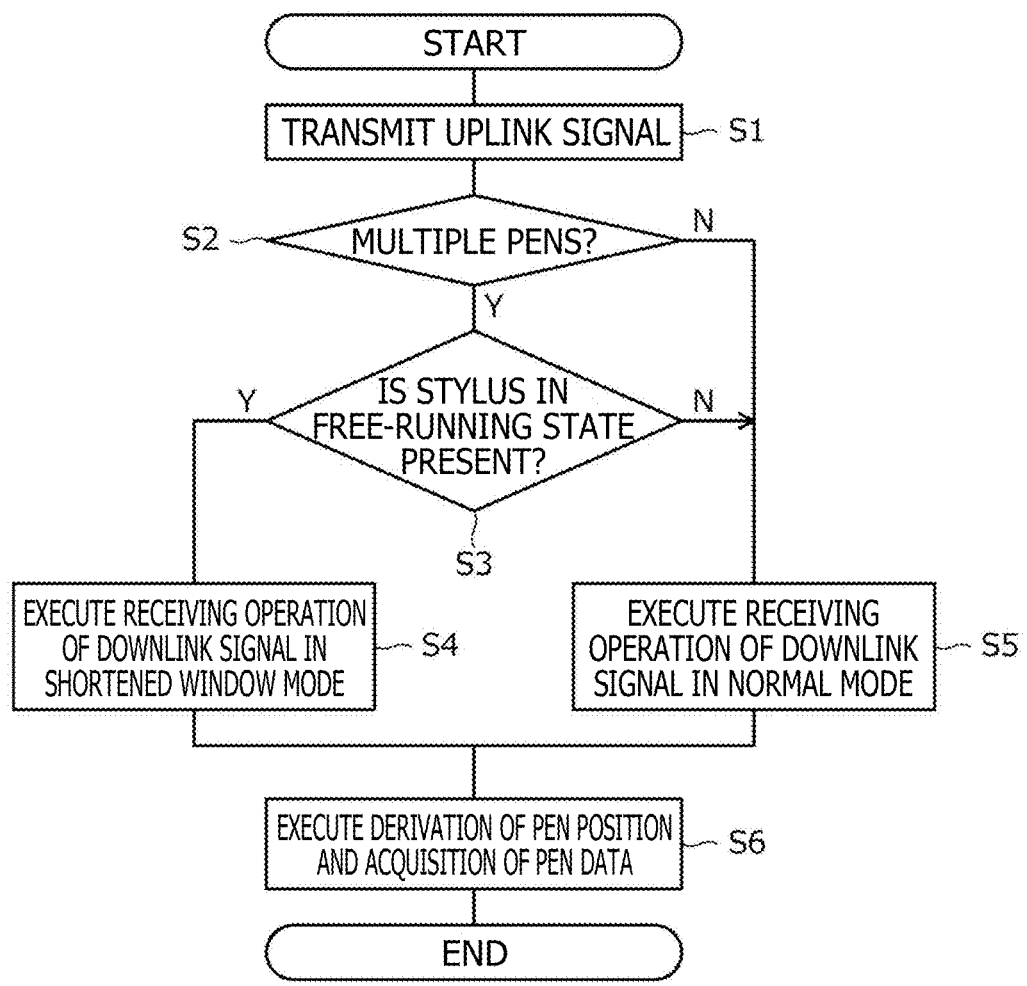

SENSOR CONTROLLER

BACKGROUND

Technical Field

The present disclosure relates to a sensor controller, and particularly to a sensor controller that receives a downlink signal transmitted by a stylus.

Description of the Related Art

In a position detecting system that realizes pen input by using a stylus, a downlink signal is transmitted from the stylus to a sensor controller. The stylus generates a string of symbols (a block of digital data sent in one modulation) on the basis of transmission data such as writing pressure values, and generates and transmits a downlink signal by modulating a carrier signal on the basis of the value of each symbol. The sensor controller demodulates the received signal to restore the symbols contained in the downlink signal. PCT Patent Publication No. WO2020/008638 discloses an example of a position detecting system in which such downlink signals are transmitted and received.

As a modulation method for the above carrier signal, a differential modulation method such as differential binary phase shift keying (DBPSK) or differential quadrature phase shift keying (DQPSK) can be suitably used. Since the sensor controller can demodulate the downlink signal by using the differential modulation method, even when the constellation has rotated due to synchronization loss or other reasons, which makes it possible to reduce transmission and reception errors of the downlink signal.

Incidentally, a conventional sensor controller is configured to set a window having the same length as the time length of the symbol and to perform demodulation of the downlink signal by using a signal received within the window. In this case, any synchronization loss between the sensor controller and the stylus will result in interference between symbols. In other words, the signal of another adjacent symbol enters the window and becomes noise. Accordingly, there is a need for a technology that can prevent interference between symbols of a downlink signal.

BRIEF SUMMARY

Therefore, one embodiment of the present disclosure provides a sensor controller that can prevent interference between symbols of a downlink signal even if synchronization with a stylus is lost.

The sensor controller according to the present disclosure is a sensor controller that a processor and a memory storing a program that, when executed by the processor, causes the sensor controller to: receive a downlink signal transmitted by a stylus, by performing an operation of receiving each symbol of a plurality of symbols constituting the downlink signal within a window time having a time length shorter than a time length of a transmission duration of each of the symbols by the stylus.

According to the present disclosure, periods in which the sensor controller does not perform receiving operations are produced at the boundaries between symbols constituting the downlink signal, so that interference between symbols of the downlink signal can be prevented even if synchronization with the stylus is lost.

BRIEF DESCRIPTION OF THE SEVERAL VIEWS OF THE DRAWINGS

FIG. 6 is a processing flow diagram illustrating the operation of a sensor controller for transmitting the uplink signal and receiving the downlink signal.

DETAILED DESCRIPTION

Hereinafter, an embodiment of the present disclosure will be described in detail with reference to the accompanying drawings.

Figure 1:
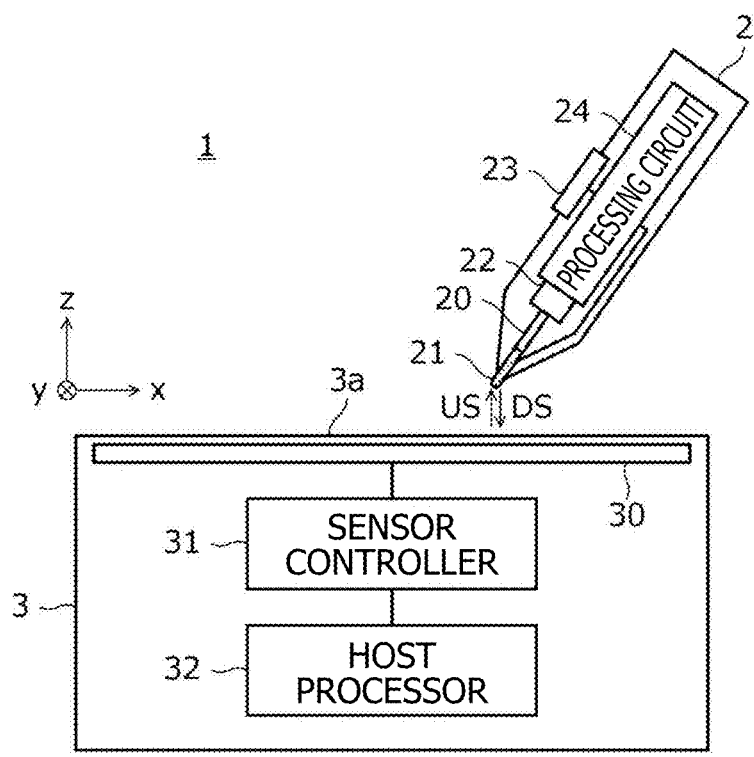
FIG. 1 is a diagram illustrating a configuration of a position detecting system according to an embodiment of the present disclosure.

FIG. 1 is a diagram illustrating a configuration of a position detecting system 1 according to the present embodiment. As illustrated in the figure, the position detecting system 1 includes a stylus 2 and a position detecting device 3.

First, attention is paid to the position detecting device 3 to see that the position detecting device 3 is a computer having the function of detecting the stylus 2, and includes a panel surface 3a (touch surface), a sensor 30 arranged directly below the panel surface 3a, a sensor controller 31, and a host processor 32 as illustrated in FIG. 1. In a typical example, the position detecting device 3 is a personal computer such as a smartphone, a tablet terminal, or a laptop computer. The panel surface 3a may also serve as the display surface of a display, and in that case, the display is disposed so as to overlap the sensor 30.

The sensor 30 is a device used for allowing the sensor controller 31 to communicate with the stylus 2, and has a group of sensor electrodes arranged on the panel surface 3a. To be specific, the sensor electrode group includes a plurality of X electrodes each extending in the y direction on the panel surface 3a and placed side by side at equal intervals in the x direction, and a plurality of Y electrodes each extending in the x direction on the panel surface 3a and placed side by side at equal intervals in the y direction. The plurality of X electrodes and the plurality of Y electrodes are each independently connected to the sensor controller 31. One of the plurality of X electrodes and the plurality of Y electrodes may also be used as common electrodes within the display, and in this case, the position detecting device 3 is called an "in-cell type." On the other hand, neither the plurality of X electrodes nor the plurality of Y electrodes may be used as common electrodes in the display, and in this case, the position detecting device 3 is called an "on-cell type" or an "out-cell type."

The sensor controller 31 is an integrated circuit that has a function of, by communicating with the stylus 2 via the sensor 30, deriving the position of the stylus 2 on the panel surface 3a (hereinafter referred to as the "pen position") and acquiring data from the stylus 2 (hereinafter referred to as the "pen data") and a function of sequentially supplying reports including the derived pen position and the acquired pen data to the host processor 32. The sensor controller 31 includes a processor that is configured to execute a program implemented as hardware or a program stored in a built-in memory, to fulfill these functions, and also is configured to be able to execute various types of processing described below.

The communication between the sensor controller 31 and the stylus 2 via the sensor 30 is performed by an active capacitance method, for example. The active capacitance method is a communication method in which signals are transmitted and received via capacitive coupling between a group of sensor electrodes that constitute the sensor 30 and a pen tip electrode 21 of the stylus 2. Hereinafter, a signal that the sensor controller 31 transmits to the stylus 2 via the sensor 30 will be referred to as an "uplink signal US," and a signal that the stylus 2 transmits to the sensor controller 31 via the sensor 30 will be referred to as a "downlink signal DS."

Figure 2:
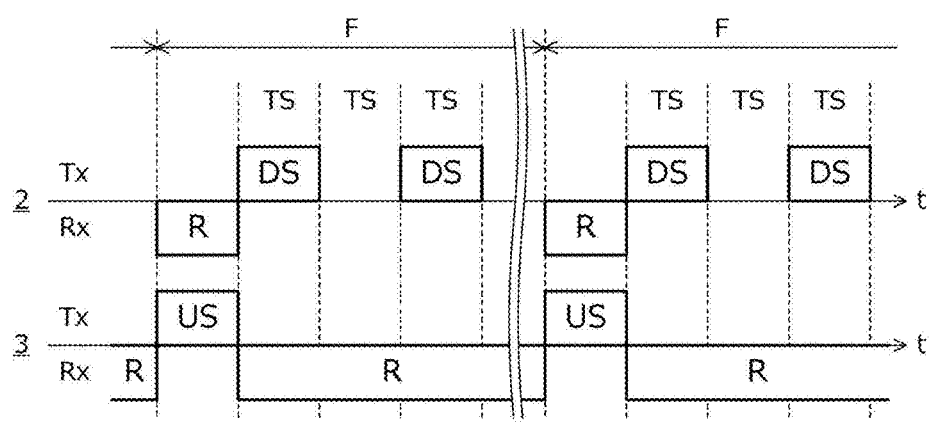
FIG. 2 is a diagram illustrating the transmission and reception timings of uplink signals and downlink signals according to the embodiment of the present disclosure.

FIG. 2 is a diagram illustrating the transmission and reception timings of the uplink signals US and the downlink signals DS. As illustrated in the figure, the sensor controller 31 is configured to communicate with the stylus 2 in units of frames F each having a predetermined time length. At the beginning of each frame F, the uplink signal US is transmitted from the sensor controller 31 to the stylus 2. In addition, in the remaining time after the transmission of the uplink signal US in each frame F, a plurality of time slots TS, which are units of time for the stylus 2 to transmit the downlink signal DS, are set.

The uplink signal US has the role of informing the stylus 2 about the position in time of the frame F and one or more time slots TS therein during which the stylus 2 should transmit the downlink signal DS. The stylus 2 detects the time position of the frame F from the reception timing of the uplink signal US, and transmits the downlink signal DS by using some of the plurality of time slots TS included therein, which are informed by the uplink signal US.

The communication between the stylus 2 and the sensor controller 31 is performed in a paired state. The stylus 2 pairs with the sensor controller 31 by receiving the uplink signal US transmitted by the sensor controller 31. Further, the sensor controller 31 also pairs with the stylus 2 by receiving the downlink signal DS transmitted by the stylus 2 in response to the uplink signal US. The sensor controller 31 is configured to be capable of pairing with a plurality of styluses 2 simultaneously, and assigns different local identifier (ID) to each of the paired styluses 2. When commands in the uplink signal US are intended for a particular stylus 2, the sensor controller 31 transmits the commands together with the local ID. The stylus 2 refers to the local ID in the received uplink signal US to determine whether or not the command contained in the uplink signal US is addressed to itself, and performs processing according to the command only in the case where the command is addressed to itself.

The downlink signal DS transmitted by the stylus 2 can include a position signal for causing the sensor controller 31 to detect the pen position, and a data signal modulated by pen data to be transmitted to the sensor controller 31. The sensor controller 31 receives a position signal by each of the plurality of X electrodes and the plurality of Y electrodes that constitute the sensor 30, approximates the distribution of the received intensity of the position signal in each of the x and y directions by using a normal distribution curve, and derives the respective peak positions, thereby deriving the pen position. Further, the sensor controller 31 also receives a data signal by one electrode of the X-electrodes or Y-electrodes closest to the most recently derived pen position, and demodulates the signal to obtain the pen data transmitted by the stylus 2. The pen data thus acquired may include, as well as responses to commands in the uplink signal US, writing pressure values detected by a pressure sensor 22 to be described later, and on/off information indicating the on/off state of a switch 23 to be described later.

The pen data further includes a free run flag. This is information in which being true is indicated when the stylus 2 paired with the sensor controller 31 fails to receive the uplink signal US at the beginning of a frame and in which being false is indicated otherwise. The stylus 2 cancels the pairing when failing to receive the uplink signal US a predetermined number of times in succession, but continues to transmit the downlink signal DS in a self-running state (free-running state) while losing sight of the synchronization reference, without canceling the pairing until the number of consecutive failures to receive the uplink signal US reaches a predetermined number of times. The free run flag indicating being true means that the stylus has entered this free-running state.

Referring to FIG. 1 again, the host processor 32 is a central processing unit of the position detecting device 3 that has the function of controlling each part of the position detecting device 3. The host processor 32 is configured to be able to execute various applications including a drawing application in addition to the operating system of the position detecting device 3 by executing programs stored in a built-in memory.

The series of reports supplied by the sensor controller 31 to the host processor 32 are used in the host processor 32 for processes executed by the operating system and drawing applications. These processes include generating and displaying digital inks, moving the cursor, and detecting various gestures such as tapping and dragging.

Next, attention will be paid to the stylus 2 to see that the stylus 2 is a pen-shaped device, and includes a core body 20, the pen tip electrode 21, the pressure sensor 22, the switch 23, and a processing circuit 24, as illustrated in FIG. 1. In addition to the above, the stylus 2 also has a battery that supplies operating power for the processing circuit 24, a memory that stores identification information of the stylus 2, and the like, but these are not illustrated in FIG. 1.

The core body 20 is a rod-shaped member that constitutes the pen tip of the stylus 2. The pen tip electrode 21 is an electrode provided at the pen tip of the stylus 2, and is used to receive the uplink signal US and transmit the downlink signal DS through capacitive coupling with the X electrodes and Y electrodes in the sensor 30. The pressure sensor 22 is a sensor that detects the pressure applied to the pen tip of the stylus 2, by detecting the force transmitted through the core body 20. The pressure value detected by the pressure sensor 22 is supplied to the processing circuit 24 as a writing pressure value. The switch 23 is provided on the surface of the stylus 2 and is configured to be able to be turned on and off by a user. The processing circuit 24 is also supplied with on/off information indicating the on/off state of the switch 23.

The processing circuit 24 is the central processing unit of the stylus 2, and generates the downlink signal DS on the basis of the uplink signal US received from the sensor controller 31, and supplies the generated signal to the pen tip electrode 21, thereby performing processing for transmitting the signal to the sensor controller 31. To be specific, regarding the position signal first, the processing circuit 24 generates and transmits the position signal by supplying an unmodulated carrier signal to the pen tip electrode 21. Next, regarding the data signal, the processing circuit 24 generates a symbol string representing the pen data and generates a modulated signal by modulating a carrier signal with the generated symbols. Then, the modulated signal that has been generated is supplied to the pen tip electrode 21, and thereby the data signal is generated and transmitted.

Figure 3A:
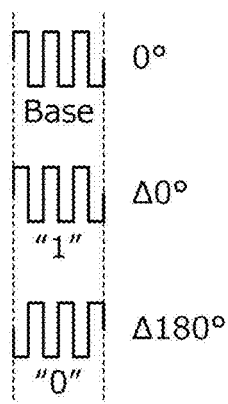
FIG. 3A is a diagram illustrating signals modulated by DBPSK.
Figure 3B:
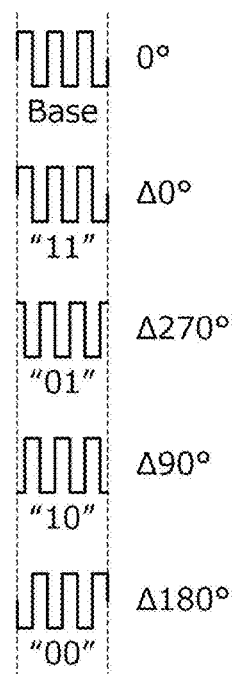
FIG. 3B is a diagram illustrating signals modulated by DQPSK.

FIG. 3A illustrates signals modulated by DBPSK, and FIG. 3B illustrates signals modulated by DQPSK. When generating a data signal, the processing circuit 24 selects either DBPSK or DQPSK according to the contact state of the pen tip with the panel surface 3*a*, and modulates the carrier signal by the selected modulation method.

As illustrated in FIG. 3A, the DBPSK is a modulation method that utilizes three states, namely, "Base," "1," and "0." In the DBPSK, "1" is represented by a phase difference of 0° from the phase of the carrier signal corresponding to "Base," which indicates the phase reference (hereinafter referred to as a "Base phase"), and "0" is represented by a phase difference of 180° from the Base phase. On the other hand, as illustrated in FIG. 3B, the DQPSK is a modulation method that utilizes five states, namely, Base, "11," "01," "10," and "00." In the DQPSK, "11" is represented by a phase difference of 0° from the Base phase, "01" is represented by a phase difference of 270° from the Base phase, "10" is represented by a phase difference of 90° from the Base phase, and "00" is represented by a phase difference of 180° from the Base phase. The DBPSK is characterized by being more noise resistant than the DQPSK because the DBPSK uses a relatively small number of states. On the other hand, the DQPSK is characterized by having a higher data rate than the DBPSK because the DQPSK uses a relatively large number of states.

The processing circuit 24 is configured to select DBPSK when it is indicated that hover (the pen tip is not in contact with the panel surface 3a) is in progress (e.g., writing pressure value=0) due to the writing pressure value supplied from the pressure sensor 22, and select DQPSK when it is indicated that pen touch (the pen tip is in contact with the panel surface 3*a*) is in progress (e.g., writing pressure value>0) due to the writing pressure value supplied from the pressure sensor 22. Due to this, it becomes possible to achieve a high data rate during the pen touch in which the reception intensity of the downlink signal DS at the sensor controller 31 is relatively high and there is little risk of reception failure, while increasing the likelihood that the sensor controller 31 can receive the downlink signal DS even during the hover in which the reception intensity of the downlink signal DS at the sensor controller 31 is relatively low.

Figure 4:
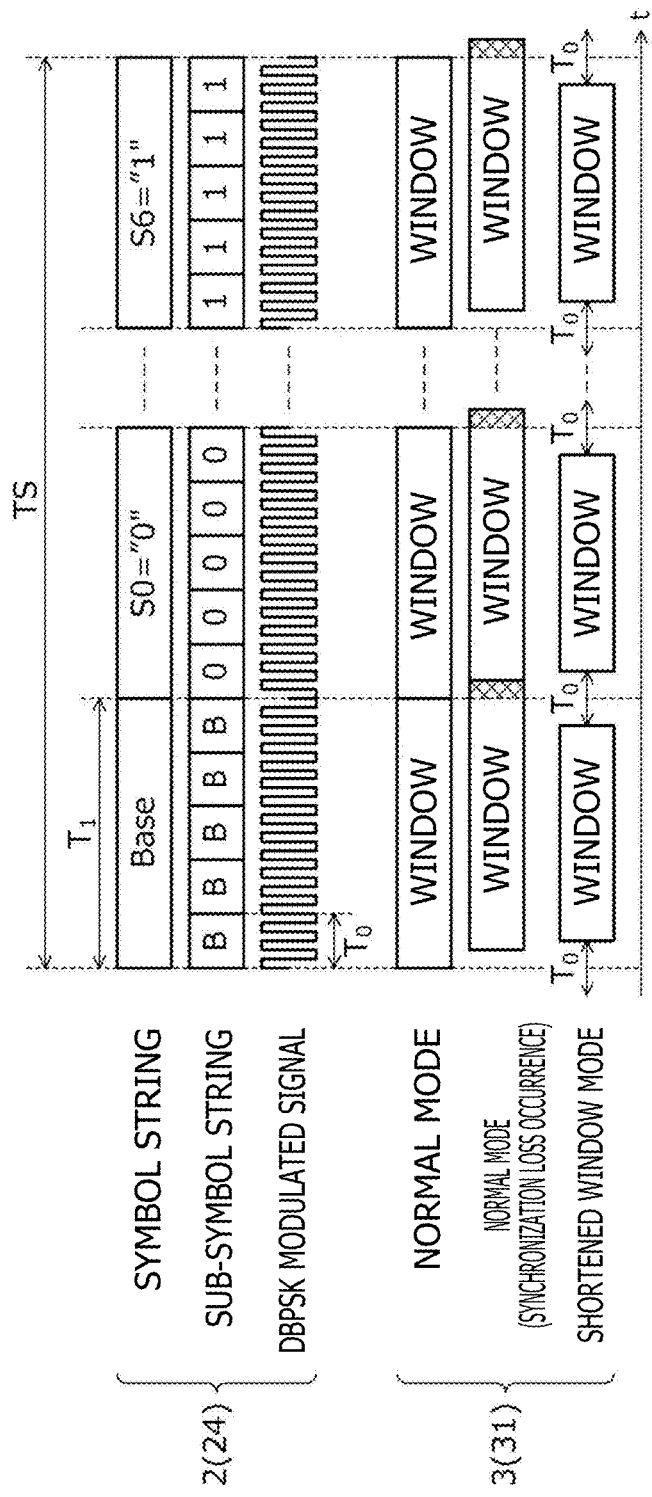
FIG. 4 is a diagram illustrating the downlink signals using the DBPSK and windows for receiving the downlink signals.
Figure 5:
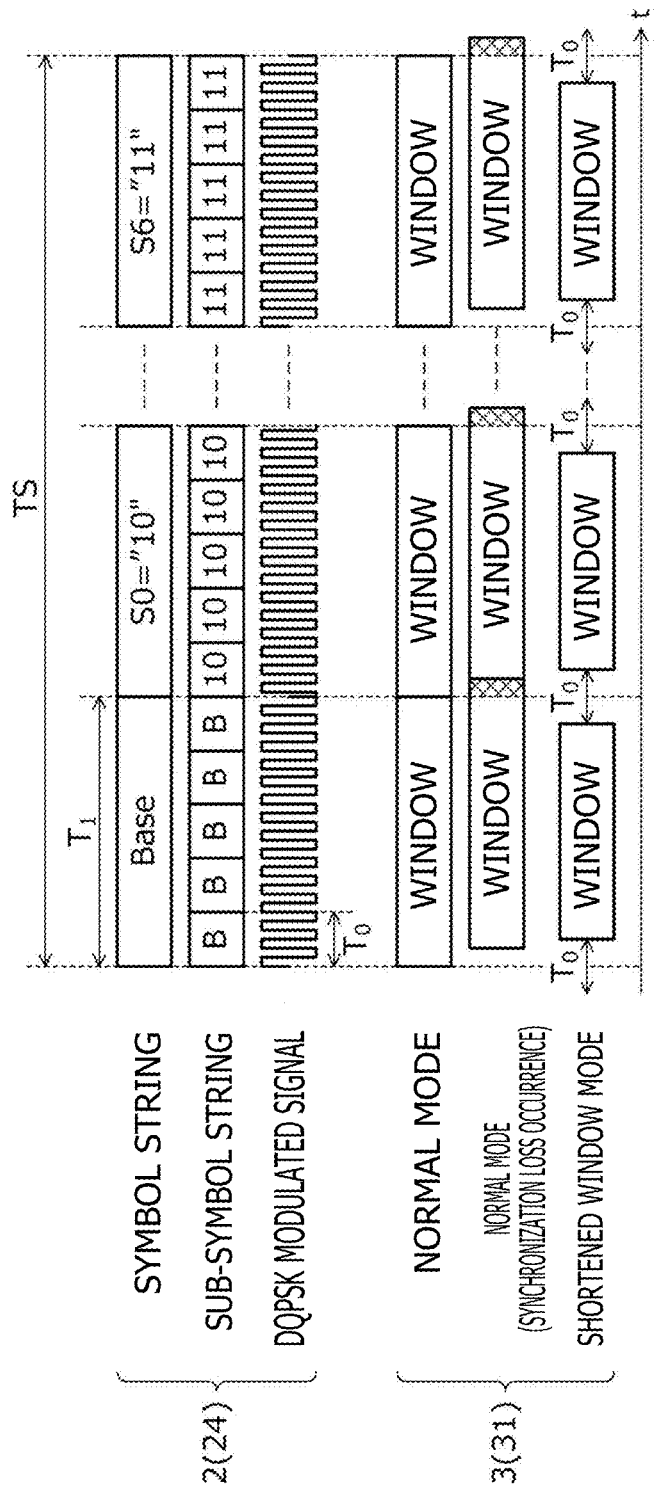
FIG. 5 is a diagram illustrating the downlink signals using the DQPSK and windows for receiving the downlink signals.

FIG. 4 is a diagram illustrating transmission and reception of the downlink signal DS during the hover, and FIG. 5 is a diagram illustrating transmission and reception of the downlink signal DS during the pen touch. The reception of the downlink signal DS by the sensor controller 31 will now be described in detail with reference to these figures, as well as the generation of the downlink signal DS by the stylus 2.

First, referring to FIG. 4, the processing circuit 24 of the stylus 2 that is hovering is configured to transmit 6 bits of pen data in one time slot TS. Therefore, the processing circuit 24 first generates a symbol string having seven symbols. The first symbol in the symbol string is "Base," and the values of the second and subsequent symbols correspond to the respective bits of the transmission object.

Next, the processing circuit 24 replicates each symbol constituting the generated symbol string to make n copies for each (n≥2), thereby generating a sub-symbol string having symbols whose number is n times the number of symbols constituting the symbol string. FIG. 4 illustrates an example where n=5, and the following description will be given by using this example.

The processing circuit 24 that has generated the sub-symbol string modulates a carrier signal with each symbol contained in the sub-symbol string. The illustrated time $T_0$ represents minimum transmission duration, which is the minimum time required to transmit one symbol. Normally, it is sufficient to send one symbol for each minimum transmission duration $T_0$, but in order to improve the accuracy of reception of the downlink signal DS by the sensor controller 31, in the present embodiment, the same symbol is transmitted five times in succession. As a result, transmission duration $T_1$ of each symbol constituting the symbol string is five times the minimum transmission duration $T_0$.

The sensor controller 31 receives the downlink signal DS by performing a receiving operation for each symbol included in the downlink signal DS within a predetermined window time for each symbol. The receiving operation of each symbol is performed by synchronous detection. That is, the sensor controller 31 has an oscillator that generates two or four reference signals having phases corresponding to each value of the symbols, and multiplies the received signal supplied from the sensor 30 by these reference signals. This multiplication is performed by using the received signal and the reference signal whose lengths correspond to the window time. The sensor controller 31 then uses a low-pass filter to remove high-frequency components from the signal obtained by the multiplication. As a result of the above processing, a direct current component remains only for the signal corresponding to the value of the received symbol, so that the sensor controller 31 determines the value of the received symbol on the basis of the remaining direct current component.

The sensor controller 31 is configured to perform the above-described operation of receiving each symbol in either a normal mode or a shortened window mode, in which the specific time length of the window time differs from each other.

The normal mode is a mode in which the time length of the window time is equal to the time length of the transmission duration $T_1$. In this case, the sensor controller 31 performs the receiving operation by using a time period five times the minimum transmission duration $T_0$, and therefore can receive the downlink signal DS with high accuracy. On the other hand, when the synchronization between the sensor controller 31 and the stylus 2 is lost, as illustrated by the shaded area in FIG. 4, a signal of another adjacent symbol will enter the window time and become noise.

The shortened window mode is a mode in which the time length of the window time is shorter than the time length of the transmission duration $T_1$ of the symbol. In a typical example, the length of the window time is set to a length obtained by subtracting the minimum transmission duration $T_0$ from the transmission duration $T_1$. When the length of the window time is set in such a manner, the length of the window time is four times the minimum transmission duration $T_0$ in the example of FIG. 4. Furthermore, the sensor controller 31 operating in the shortened window mode is configured to start a receiving operation later than the start of the period during which each symbol is supposed to be received, by half the minimum transmission duration $T_0$. As can be seen from FIG. 4, due to this, even if the occurrence of a synchronization loss causes a slight shift between the symbol reception time and the window time, as long as the shift is within $T_0/2$, the signal of another adjacent symbol can be prevented from entering the window time.

Referring now to FIG. 5, the processing circuit 24 of the stylus 2 during the pen touch is configured to transmit 12 bits of pen data in one time slot TS. As in the case of FIG. 4, the processing circuit 24 generates a symbol string having seven symbols, but the value of the m-th symbol (m≥2) corresponds to the two bits of the (2m−3)th and (2m−2)th bits of the transmission object. The other points are as described with reference to FIG. 4.

FIG. 6 is a processing flow diagram illustrating the operation of the sensor controller 31 related to the transmission of the uplink signal US and the reception of the downlink signal DS. The figure illustrates the operation of the sensor controller 31 in one frame F. Hereinafter, the operation of the sensor controller 31 will be described in more detail with reference to this processing flow diagram.

As illustrated in FIG. 6, the sensor controller 31 first transmits the uplink signal US (S1), and then determines whether or not communication is being performed with the plurality of styluses 2 (whether or not communication is being performed in a multi-pen state) (S2). When it is determined at S2 that communication is being performed with a plurality of styluses 2, the sensor controller 31 further determines whether or not there is the stylus 2 in the free-running state (S3). The sensor controller 31 may make the determination at S3 by referring to the free run flag in the downlink signal DS received from each stylus 2 in the previous frame F.

When it is determined at S3 that there is the stylus 2 in the free-running state, the sensor controller 31 executes a receiving operation of the downlink signal DS in the shortened window mode in each time slot TS (S4). On the other hand, when it is determined at S2 that communication with the plurality of styluses 2 is not in progress, and when it is determined at S3 that there is no stylus 2 in the free-running state, the sensor controller 31 performs a receiving operation of the downlink signal DS in the normal mode in each time slot TS (S5).

Thereafter, on the basis of the reception result of the downlink signal DS at S4 or S5, the sensor controller 31 derives the pen position of each paired stylus 2 and acquires the pen data transmitted by each paired stylus 2 (S6). The derived pen position and acquired pen data are provided to the host processor 32 as a report, as described above.

As described above, according to the sensor controller 31 of the present embodiment, at the time of operating in the shortened window mode, periods during which no receiving operation is performed are produced at the boundaries between symbols constituting the downlink signal DS. Therefore, since a signal of another adjacent symbol can be prevented from entering the window time, interference can be prevented from occurring between symbols of the downlink signal DS even if synchronization with the stylus 2 is lost.

Furthermore, when the sensor controller 31 of the present embodiment is paired with the plurality of styluses 2 and one or more of the paired styluses 2 are in the free-running state, the sensor controller 31 receives the downlink signals DS of all the styluses 2 in a shortened window mode, thereby making it possible to receive the downlink signals DS from the respective styluses 2 uniformly.

Although the preferred embodiment of the present disclosure has been described above, the present disclosure is not limited to the embodiment, and it goes without saying that the present disclosure can be embodied in various forms without departing from the spirit of the present disclosure.

For example, in the above embodiment, an example is described in which the sensor controller 31 uses the shortened window mode only when paired with the plurality of styluses 2, but the sensor controller 31 may also use the shortened window mode even when paired with only one stylus 2. This makes it possible to improve the reception conditions of the downlink signal DS transmitted by the stylus 2, when the stylus 2 is in the free-running state.

In addition, in the above embodiment, an example is described in which the sensor controller 31 is configured to receive the downlink signals DS of all the styluses 2 in the shortened window mode when the sensor controller 31 is paired with the plurality of styluses 2 and one or more of the styluses 2 are in the free-running state, but the sensor controller 31 may also be configured to receive the downlink signals DS in the shortened window mode only during the time slots TS assigned to the styluses 2 in the free-running state, and to receive the downlink signals DS in the normal mode during the other time slots TS. In this case, it becomes difficult to uniformly receive the downlink signals DS from respective styluses 2, but it becomes possible to receive, with high accuracy, the downlink signal DS transmitted by the stylus 2 that is not in the free-running state.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensor controller comprising:
   a processor;
   a memory storing a program that, when executed by the processor, causes the sensor controller to:
   receive a downlink signal transmitted by a stylus, by performing an operation of receiving each of a plurality of symbols constituting the downlink signal within a window time having a time length shorter than a time length of a transmission duration of one symbol of the plurality of symbols transmitted by the stylus.

2. The sensor controller according to claim 1, wherein the transmission duration is a transmission duration of a modulated signal modulated by the one symbol of the plurality of symbols.

3. The sensor controller according to claim 1, wherein the time length of the transmission duration is a multiple of a minimum transmission duration of the one symbol of the plurality of symbols, and the time length of the window time is a length obtained by subtracting the minimum transmission duration from the transmission duration.

4. The sensor controller according to claim 3, wherein transmission of the downlink signal is executed in a state where the stylus and the sensor controller are synchronized with each other, and a receiving operation is started with a delay of a half of the minimum transmission duration from a start of a period during which the each of the plurality of symbols is supposed to be received.

5. The sensor controller according to claim 1, wherein the program, when executed by the processor, causes the sensor controller to be selectively operable in either a normal mode in which the time length of the window time is equal to the time length of the transmission duration, or a shortened window mode in which the time length of the window time is shorter than the time length of the transmission duration.

6. The sensor controller according to claim 5, wherein the sensor controller, in operation, receives the downlink signal in the shortened window mode when the sensor controller is paired with a plurality of styluses and one or more of the plurality of styluses is in a free-running state.

7. The sensor controller according to claim 6, wherein the sensor controller determines whether or not the one or more of the plurality of styluses are in the free-running state, based on information contained in the downlink signal.

\* \* \* \* \*